United States Patent [19]
Noro

[11] Patent Number: 5,317,494
[45] Date of Patent: May 31, 1994

[54] POWER SUPPLY CIRCUIT UTILIZING VOLTAGE AND CURRENT RESONANCE FOR REDUCING SWITCHING LOSS

[75] Inventor: Masao Noro, Hamamatsu, Japan

[73] Assignee: Yamaha Corporation, Hamamatsu, Japan

[21] Appl. No.: 949,079

[22] Filed: Sep. 22, 1992

[30] Foreign Application Priority Data

Sep. 24, 1991 [JP] Japan .................................. 3-271963

[51] Int. Cl.⁵ .......................................... H02M 3/338
[52] U.S. Cl. .................................... 363/18; 323/282; 363/19
[58] Field of Search ............................ 363/18, 19, 21; 323/282; H02M 3/338, 3/155

[56] References Cited

U.S. PATENT DOCUMENTS

| | | | |
|---|---|---|---|
| 4,685,041 | 8/1987 | Bowman et al. | 363/40 |
| 4,814,962 | 3/1989 | Magalhaes et al. | 363/16 |
| 4,845,605 | 7/1989 | Steigerwald | 363/21 |
| 4,857,822 | 8/1989 | Tabisz et al. | 323/282 |
| 5,177,675 | 1/1993 | Archer | 363/25 |

FOREIGN PATENT DOCUMENTS

| | | | |
|---|---|---|---|
| 61-295875 | 12/1986 | Japan | H02M 3/28 |
| 3-27768 | 2/1991 | Japan | H02M 3/28 |
| 3-164065 | 7/1991 | Japan | H02M 3/155 |

Primary Examiner—William H. Beha, Jr.
Attorney, Agent, or Firm—Graham & James

[57] ABSTRACT

In a power supply circuit, upon turning on of a switching element, a sinusoidal resonance current flows through a series resonance circuit and a smoothing capacitor of a dc output circuit is thereby charged. This resonance current is reversed after a half cycle and a rectifying diode is thereby reversely biased whereby the resonance path is cut off and the resonance current is automatically ceased. While the switching element is on, exciting of an inductance and charging of a capacitor are made in a parallel resonance circuit, though resonance is not made therein. By turning off the switching element in a current zero state thereafter, a parallel resonance by the parallel resonance circuit is started. The switching element is turned on at a timing when voltage of the parallel resonance circuit has returned to a power source voltage. A power supply circuit performing all switching operations at a voltage zero state or a current zero state is realized with a single power source and a circuit design thereby can be simplified.

6 Claims, 6 Drawing Sheets

POWER SUPPLY CIRCUIT UTILIZING VOLTAGE AND CURRENT RESONANCE FOR REDUCING SWITCHING LOSS

BACKGROUND OF THE INVENTION

This invention relates to a power supply circuit of a switching inverter type and, more particularly, to a power supply circuit of this type capable of reducing switching loss to the maximum and improving conversion efficiency by utilizing both voltage resonance and current resonance.

As a power supply circuit intended to reduce switching loss to the maximum and improving conversion efficiency by utilizing both voltage resonance and current resonance, there is the applicant's co-pending U.S. patent application Ser. No. 07/896,214.

Description will be made about this power supply circuit below. This power supply circuit aims at reducing switching loss to the maximum and improving conversion efficiency by utilizing both voltage resonance and current resonance as well as reducing noise by enabling operation waveforms of voltage and current appearing at respective component parts of the circuit to simulate a sine wave to a maximum degree.

This power supply circuit includes, as shown in FIG. 2, a dc power source 1, switching means 2 including switching elements which are turned on and off at desired timing, switching a dc input from the dc power source 1 to convert it to ac and providing it as an ac output from an output terminal thereof, series resonance means 4 provided in series to current flowing from the output terminal of the switching means 2, parallel resonance means 5 provided in parallel to voltage produced at the output terminal of the switching means 2, dc output means which full-wave rectifies and smoothes an ac input supplied through the series resonance means 4 and the parallel resonance means 5 to provide a dc output, and switching control means 6 which controls the switching elements of the switching means 2 so that the switching elements turn on respectively intermittently.

FIG. 3 is a circuit diagram showing the basic construction of the power supply circuit of the invention shown in FIG. 2 somewhat more specifically. The operation of the basic construction of FIG. 3 will be described with reference to the flow chart of FIG. 4.

When switching elements S1 and S2 are being turned on and off repeatedly at a timing shown in (f) and (g) of FIG. 4, power source voltages $+VI$, $-VI$ are converted into ac having substantially a peak valve of VI at a point A of the circuit of FIG. 3. This ac is rectified by diodes D1 and D2 through an inductance L2 and a capacitor C2. The rectified signal is smoothed by capacitors C3 and C4 to become dc and the dc current flows through a load RL. As the diodes D1 and D2 and the capacitors C3 and C4, the elements of substantially the same characteristics are used.

When the switching element S1 is in the on state, the diode D1 is in a forward direction so that charge current iD1 flows to the capacitor C3. Since a relation that the capacitor C3 is much larger than the capacitor C2 (C3>>C2) and impedances of the switching element S1 and the diode D1 are sufficiently small is established, this current iD1 becomes series resonance current of a sine waveform due to the inductance L2 and the capacitor C2 (see (b) of FIG. 4). Since reverse voltage is applied to the diode D1 and the diode D1 is turned off when the direction of reverse current is reversed upon lapse of half cycle, series resonance is stopped. In other words, when the resonance current has finished its half cycle and has become zero, the resonance is automatically stopped.

At this time, charge corresponding to the resonance current which has flown to this time point has been accumulated in the capacitor C2 and voltage VC2 across the capacitor C2 remains (see (e) of FIG. 4). Since this charge QC2=C2·VC2 is discharged to the load during a next cycle during which the switching element S2 is on state and, therefore, there is no energy loss. Since energy stored in inductance is proportional to current flowing through the inductances, energy stored in the inductance L2 is zero when the resonance has stopped at the current zero state. This signifies that generation of harmfull noise in this circuit portion is very small and also signifies an important condition under which a voltage resonance mode is established.

In order to reduce the magnetic energy of the inductance L2 completely to zero, it is necessary to keep the switching element S1 in the on state until the resonance current has become zero. It will be no use to keep the switching element S1 in the on state after the resonance current has become zero but it will be inefficient to simply prolong a time period during which energy is not transmitted. The switching element S1 therefore may be turned off with some allowance of time (TQ1−Ti). Since the resonance time (a cycle of resonance current) by the inductance L2 and the capacitor C2 is constant, a time period during which the switching element S1 is on state may also be a constant value.

When the switching element S1 is turned off, the current resonance has already finished and the current becomes zero and, therefore, current flowing through the switching element S1 at this time is only current flowing to the inductance L1. The value of the inductance L1 can be set independently from the values of the inductance L2 and the capacitor C2 and, by establishing a relation that inductance L1 is much larger than inductance L2 (L1>>L2), current flowing through the inductance L1 can be of a value sufficiently smaller than the resonance current of the inductance L2 and the capacitor C2 and, therefore, the switching element S1 is turned off in a nearly zero current state and, as a result, loss in turning off of the switching element S1 is extremely small. When the switching element S1 is turned off (since the switching element S2 has not been turned on, both switching elements S1 and S2 are off), the diodes D1 and D2 are also off and, therefore, the elements which are in electric operation at this time are only the inductance L1 and the capacitor C1.

Magnetic energy (current) stored in the inductance L1 during the on state of the switching element S1 constitutes energy which operates parallel resonance with the capacitor C1 which causes voltage at the point A to drop in a sine wave form and approach the potential −VI exceeding the zero point. The operation performed during this time period is the voltage resonance mode. The voltage resonance waveform in principle assumes a form as shown in (a) of FIG. 4 which is a vertically symmetrical form with respect to a point crossing the reference potential (i.e., the potential designated by "0" in (a) of FIG. 4). Depending, however, upon an actual circuit design, deformation in the waveform will take place (e.g., a case where a timing control circuit to be described later consumes a part of energy of voltage resonance through its windings).

When the potential at the point A has dropped to nearly $-VI$ (i.e., below the potential at one end of capacitor C4), the diode D2 is turned on and thereby causes energy charged in the capacitor C4 to discharge to inductance L1 through the diode D2, the capacitor C2 and the inductance L2. Since the current flowing through the inductance L1 is set a small value, a large change in the current value does not take place but the potential at the point A remains at a value near $-VI$. If the switching elements S1 and S2 are kept in the off state, the magnetic energy (current) of the inductance L1 will be reduced to zero in a time length which is about half of the time period during which the switching element S1 is on and voltage across the inductance L1 (or capacitor C1) drops from the potential near $-VI$ to zero. Alternatively stated, since the point A can be held at the potential near $-VI$ by the magnetic energy of the inductance L1 during about half of the time period during which the switching element S1 is on, if the switching element S2 is turned on within this time period, it can perform a switching-on operation in a state where voltage across the switching element S2 is extremely small. Loss during the switching-on of the switching element S2 therefore is extremely small.

The voltage across the switching element S2 when it is turned on (i.e., difference between the above described potential near $-VI$ and $-VI$) is exactly not zero but there exists voltage due to Vc2 (which is voltage across the capacitor C2) left after the current resonance during the on state of the switching element S1. The voltage Vc2 becomes a different value depending upon the value of the capacitor C2. Since the value of C2 can be set with a relatively large degree of freedom in relation to the inductance L2 and loss is generally smaller when the value of C2 is large and the value of L2 is small within a range in which series resonance can take place, the value of voltage VC2 consequently becomes small which can be almost neglected as compared with the voltage VI.

Upon turning on of the switching element S2, current resonance on the negative side takes place with a result that charge current flows to the capacitor C4. Subsequently, as shown in FIG. 3, the above operation is repeated with the switching elements S1 and S2 taking their place in turn.

Time between turning off of the switching element S1 and turning on of the switching element S2 may be set at a slightly longer time length than a time period during which the point A reaches the potential near $-VI$ due to the voltage resonance by the inductance L1 and capacitor C1 after turning off of the switching element S1. It will be inefficient as well to take a longer time. This time period need not be set so strictly but a certain fixed value may be used.

Some more consideration will be given for the time period during which the switching elements S1 or S2 is on and the time period from turning off of the switching element S1 or S2 till turning on of the switching element S2 or S1. It may be basically said that the on period of each switching element should be set to a longer period than half cycle of resonance of the series resonance means and the off period of both switching elements should be set to a shorter period than half of the resonance period of the parallel resonance means. In this case, consideration should however be given to the amount of energy which is previously given to the voltage resonance circuit of the inductance L1 and the capacitor C1 before starting the voltage resonance mode. Consideration should also be given to the manner of determining values of the inductance L1 and the capacitor C1 even when the parallel resonance frequency is set at a certain value. The on period of each switching element determines the amount of the given energy and the off-period of both switching elements should be limited to determine by the given energy (i.e., the value corresponding to the on period). According to analysis made by the inventor, it has been found that, in actuality, once the on period and the off period have been determined, the switching frequency is determined at this time and the parallel resonance (voltage resonance) frequency satisfying the operation of this invention and a usable portion of the parallel resonance waveform are solely determined. When, for example, the on period is set to infinite small (substantial zero), the voltage resonance waveform in this case seems to change substantially in the shape of a sine waveform with substantially the same frequency as the switching frequency. It should be noted, however, that, in some cases, a desired output terminal voltage change of 2 VI is not realized notwithstanding that the voltage resonance has reached its peak value.

Further, as will be apparent from the above description, it is desirable that there should be the relations $L1 >> L2$ and $C2 >> C1$ as condition for setting the values of the respective resonance circuits. The rectification should be made by the full-wave rectification system. As the smoothing system, a capacitor input system should be used for the current resonance. The capacity of the smoothing capacitors C3 and C4 should be much larger than the capacitor used in the series resonance means 4 so as to prevent decrease in Q of the current resonance.

In realizing the above described basic construction as a specific circuit, as will be apparent from the above described principle, the relations $L1 >> L2$ and $C2 >> C1$ are desirable as actual condition for setting values of the respective resonance circuits. For satisfying these relations, primary self inductance of the transformer is effectively used as L1, an independent inductance or leakage inductance between the primary and the secondary of the transformer is used as L2. Since the rectifying circuit is positioned on the secondary side of the transformer, either a center tap type rectifying circuit or a bridge type one may be used. In any case, it must be a full-wave rectifying circuit because the current resonance must be performed with both positive and negative currents. As the smoothing circuit, a capacitor input type circuit is used for the current resonance and the relation $C3 >> C2$ is maintained so as to prevent drop of Q (quality) factor in the current resonance.

The transformer viewed from the primary side is shown in FIG. 5. Since the transformer has self inductance and leakage inductance, these inductances may be utilized as L1 and L2 of FIG. 2 by properly setting the values of these inductances in the circuit design. In a general transformer, the relation $L1 > L2$ is satisfied.

The basic circuit of FIG. 3 can be modified in the form shown in FIG. 6. In FIG. 6, the current resonance is performed by the inductance L2 and the capacitor C2 which is divided in two capacitors whereas the voltage resonance is performed by the inductance L1 and the capacitor C1 which is divided in two capacitors and the inductance L1. The circuit of FIG. 5 may seem to be different from the circuit of FIG. 2 in that the loop of the voltage resonance includes both the inductance L2 and the capacitor C2 but since there are the relations L2<<L1 and C2>>C1, the presence of L2 and C2 does not substantially affect the voltage resonance and, accordingly, the voltage resonance is virtually performed by the capacitor C1 and the inductance L1 in the same manner as in the circuit of FIG. 3.

FIG. 7 shows a more specific circuit using a transformer T1 having self inductance L1 and leakage inductance L2. In this circuit, a center tap type output circuit is used as the output circuit. The center tap winding is adopted because the number of diodes in the rectifying path in each rectifying cycle thereby can be reduced and, as a result, loss due to these diodes can be held to the minimum and efficiency of the circuit as a whole can be improved. Further, two transistors are utilized as the switching elements S1 and S2. Each transitor is switched by a driving circuit having a fixed switching timing as shown in (f) and (g) of FIG. 4. Accordingly, a power supply circuit with low noise and high efficiency can be realized by a simple construction.

Benefits derived from the above described power supply circuit are summarized as follows:

First, as an advantageous result of the current resonance, noise due to current is reduced. The current noise is particularly produced when a large amount and an abrupt change in current takes place in a portion where a large current flows. The current resonance automatically stops when the current which changes in the shape of a sine wave has been reduced to zero and, therefore, very little noise is generated. As to the improvement of efficiency, the switching elements S1 and S2 are turned off at the current zero state and voltage through the diodes D1 and D2 is also reversed after the current has been reduced to zero, so that the adverse effect to the efficiency during the recovery time is reduced.

Advantageous results of the voltage resonance also are reduction of noise and improvement of efficiency of the circuit as a whole. Since parts such as semiconductors used in the power supply circuit are mounted on a chassis through an insulating material for heat radiation, electrostatic capacity may be formed by electrode-s of the parts and the chassis. The part electrode is provided with an ac signal and, accordingly, current flows to this capacity which becomes a main cause of a common mode noise. The semiconductors have also a junction capacity by itself and the inductances and transformer also have line capacity. These capacities do not appear in the circuit diagram but actually exist in the respective parts and the circuit board and, therefore, current flows to all these capacities when the circuit is in operation. Since this current is one flowing to the capacity, it becomes larger when change in the voltage (dV/dT, i.e., ratio of change in voltage V to time T) is larger. When switching is made with a square wave, this current becomes a pulse-like current generates a current noise and current flowing to the chassis causes a pulse-like common mode noise. Since this pulse-like current is supplied by the switching transistors, loss in the switching transistors is produced with resulting decrease in the efficiency. Besides, since voltage having a large dV/dT contains a high frequency component, a radio wave radiated directly from the circuit (unnecessary radiation) also becomes large.

By using the voltage resonance producing a waveform approximating a sine wave and thereby reducing dV/dT, these problems can be overcome. According to the invention, the voltage resonance is performed by the inductance L1 and the capacitor C1 only when both the switching elements S1 and S2 are on and, therefore, loss in the switching elements S1 and S2 is not produced. The current flowing through the inductance L1 and the capacitor C1 is mere transfer of mutual energy so that only reactive power is consumed and loss due to the voltage resonance is very small (theoretically zero).

For reducing a voltage type noise, it is important that dV/dT of voltage waveforms at all terminals of the circuit is neglibly small. If there is a square wave at one terminal only, it will become a noise source. Power supply circuits of a conventional voltage resonance type mostly contain square waves (e.g., in circuit portions other than a transformer output), though they have a sine wave at one spot in the circuit (e.g., in the transformer output). It is a final object of this invention to realize a practical low-noise power supply circuit and it is a feature of the invention that all voltage waveforms are similar to the voltage resonance waveform by the inductance L1 and the capacitor C1. This is achieved by performing the voltage resonance at a different time from the current resonance. That is, after reducing currents of the switching elements S1 and S2 and the diode D2 to zero and reducing also the magnetic energy of the inductance L2 to zero by the current resonance, the voltage resonance is started and, by bringing the switching elements S1 and S2 and the diodes D1 and D2 in an off state and thereby reducing current in the inductance L2 and the capacitor C2 in the voltage resonance mode to zero, the waveform at the point A and the waveform at the point A' become similar to each other. The terminal voltage waveforms of the inductance L1 and the capacitor C1 thereby become similar to the terminal waveforms of the switching elements S1 and S2, inductance L2, capacitor C2, and diodes D1 and D2 and a square wave disappears from the circuit.

The above described power supply circuit actually uses two powers and therefore requires at least two switching elements with the result that this circuit requires a complex circuit design. It is therefore difficult to apply this circuit to a switching power source of a single power source used for relatively low power applications.

It is, therefore, an object of the invention to provide a power supply circuit capable of realizing turning on at a voltage zero state and turning off at a current zero state in the same manner as in the above described power supply circuit in a switching power source of a single power source thereby achieving improvement in efficiency and reduction of noise in such power supply circuit.

SUMMARY OF THE INVENTION

A power supply circuit achieving the above described object of the invention comprises a dc power source, switching means including a switching element for switching a dc input from the dc power source to convert the dc input to ac and outputting ac from an output terminal thereof, the ac changing between two different potentials, series resonance means provided in series to current flowing from the output terminal of the switching means for generating current resonance, parallel resonance means provided in parallel to voltage produced at the output terminal of the switching means for generating voltage resonance, dc output control means for rectifying and smoothing an ac input supplied from the switching means through the series resonance means and the parallel resonance means, and switching control means for controlling the switching element of the switching means so as to intermittently turn on the switching element, wherein said switching control means, after turning on of the switching means, turns off the switching means when current flowing through the switching means has been reduced substantially to zero by the series resonance means and, after turning off of the switching means, turns on the switching means when voltage applied to the switching means has returned substantially to a voltage immediately before turning off of the switching means by the parallel resonance means.

According to the invention, series resonance is produced by turning on the switching means, parallel resonance is produced by turning off the switching means when the series resonance means has substantially been completed, and the switching means is turned on when voltage applied to the switching means by this parallel resonance has changed and returned substantially to a state immediately before turning off of the switching means, whereby turning off of the switching means at a voltage zero state are realized. In this state, the parallel resonance causes not voltage change from one voltage to another as in the above described circuit but voltage change starting from one voltage and returning to the same voltage, so that two power sources are unnecessary and a single switching element will suffice. As a result, the number of component parts can be reduced and a power supply circuit suitable for low power applications can be realized.

In one aspect of the invention, in the power supply circuit described above, a transformer is provided in a single path from the switching means to the dc output means and said series resonance means comprises a capacitor provided on the transformer and leakage inductance between the primary and secondary sides of the transformer.

According to this aspect of the invention, the parallel resonance and the series resonance are realized by utilizing self inductance and leakage inductance of the transformer and, therefore, it is not necessary to provide an independent inductance or, if such independent inductance is provided, only a small inductance will suffice.

Preferred embodiment of the invention will be described below with reference to the accompanying drawings.

BRIEF DESCRIPTION OF THE DRAWINGS

In the accompanying drawings.

DESCRIPTION OF PREFERRED EMBODIMENT

Figure 1:
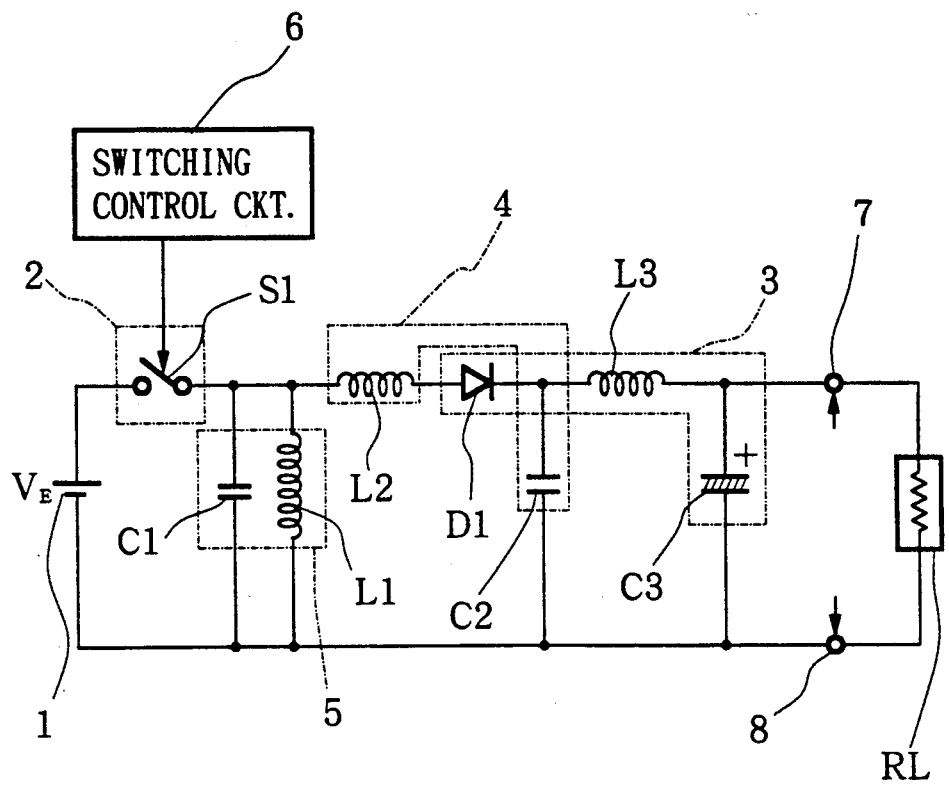
FIG. 1 is a circuit diagram showing an embodiment of the invention.
Figure 2:
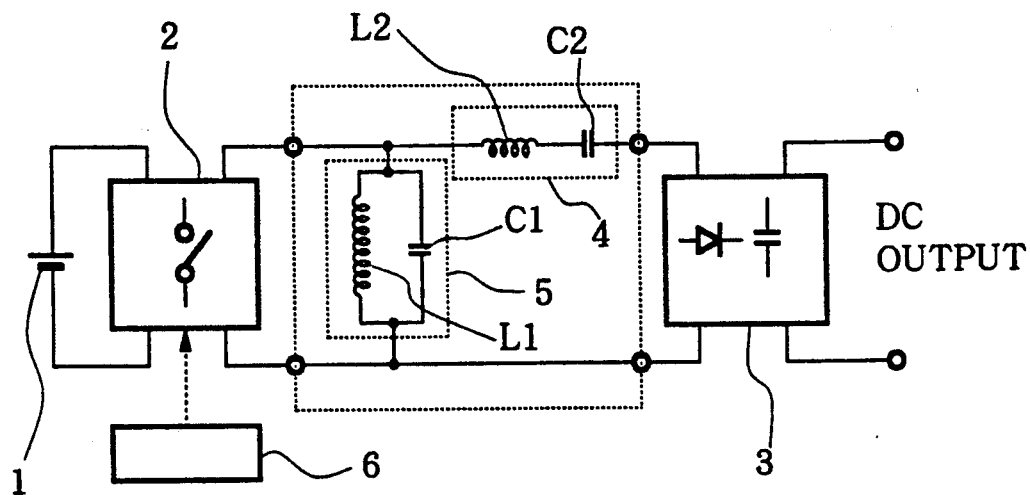
FIG. 2 is a block diagram showing schematically a basic principle of the power supply circuit described in U.S. patent application Ser. No. 07/896,214.
Figure 3:
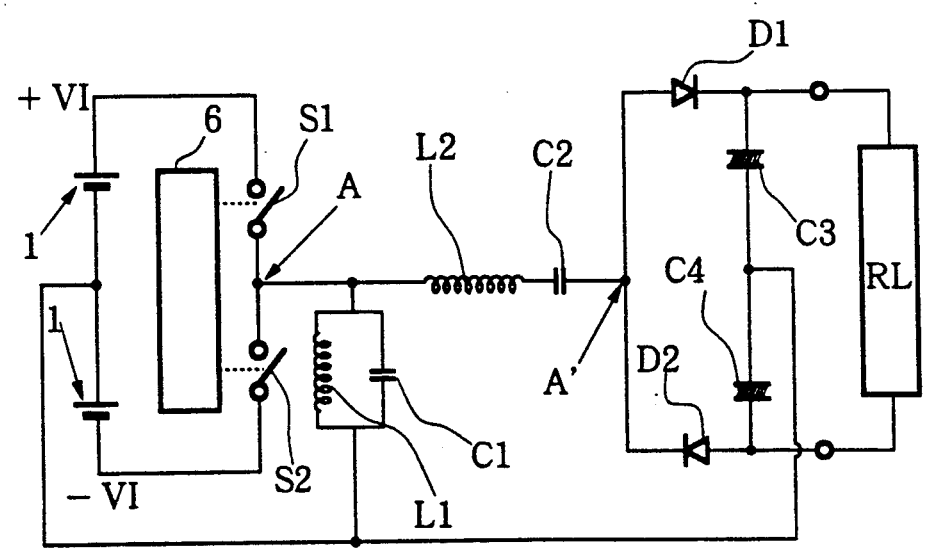
FIG. 3 is a circuit diagram showing a basic construction of the power supply circuit of FIG. 2.
Figure 4:
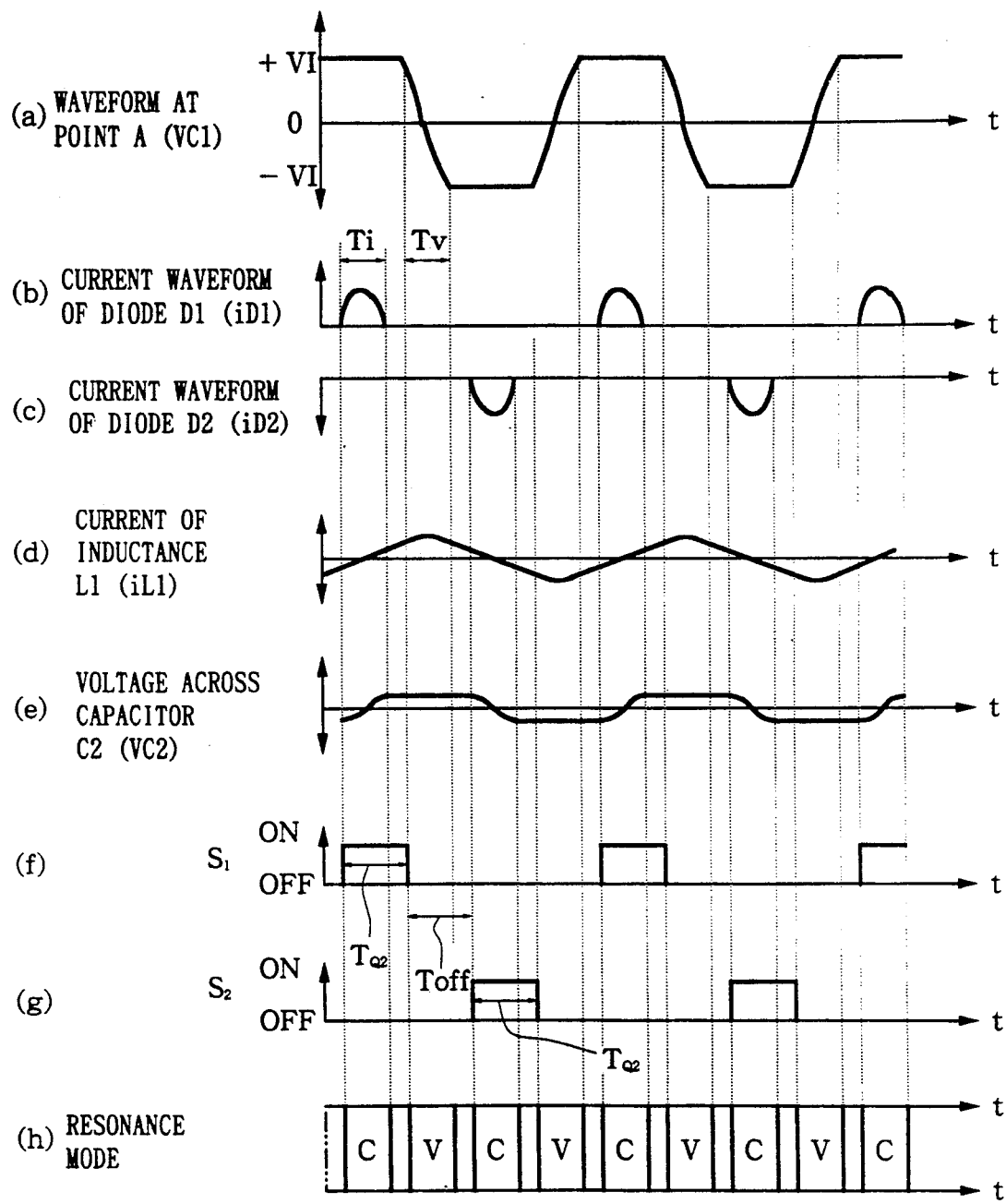
FIG. 4 is a time chart for explaining operation of the basic construction of FIG. 3.
Figure 5:
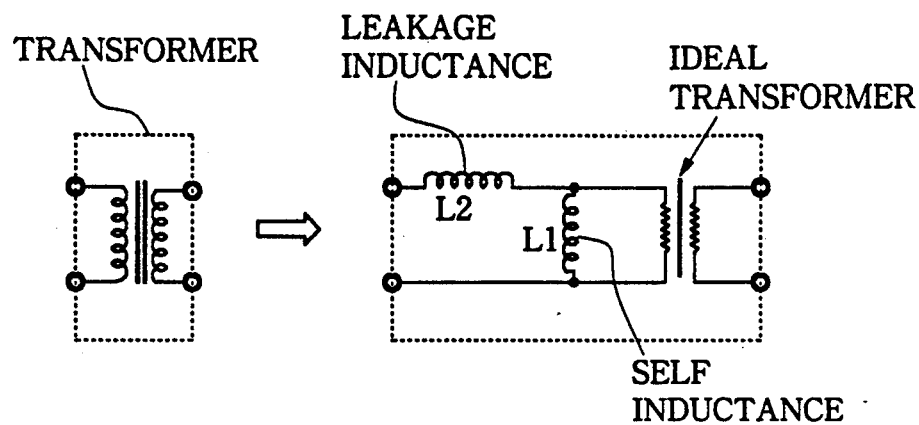
FIG. 5 is a diagram for explaining an equivalent circuit of a transformer.
Figure 6:
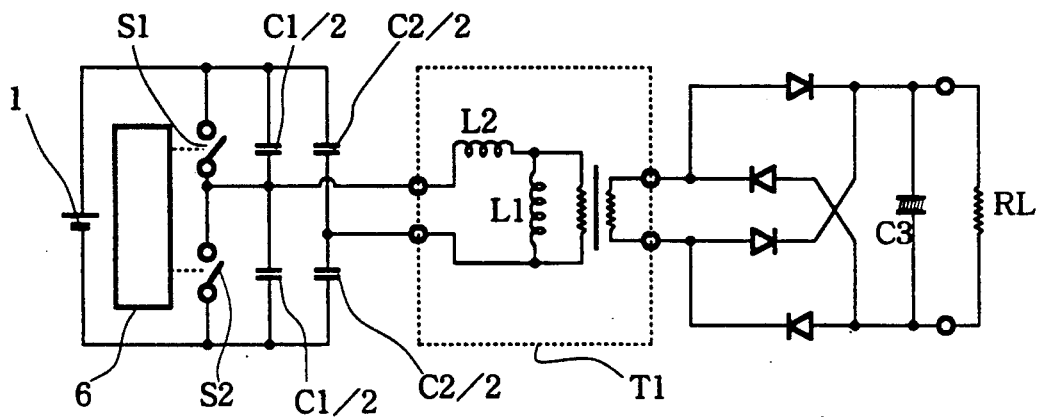
FIG. 6 is a circuit diagram for explaining a modified example of the basic construction of FIG. 3.
Figure 7:
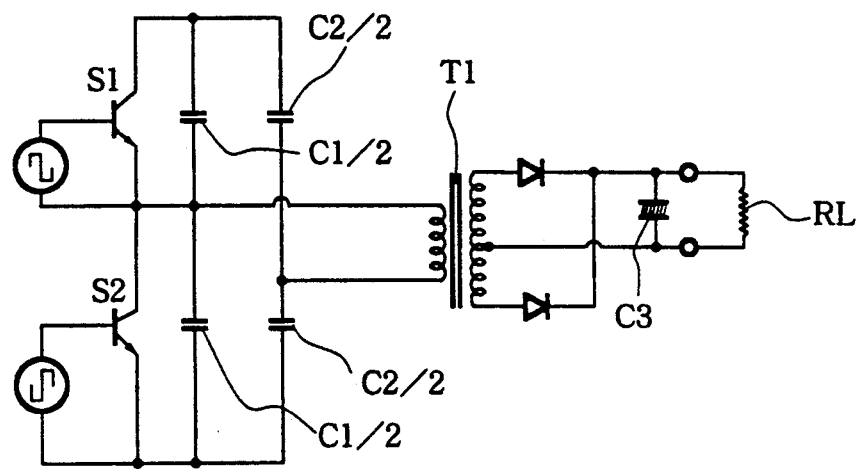
FIG. 7 is a circuit diagram showing an embodiment which is modified form of the basic construction of FIG. 3.

FIG. 1 shows a basic principle of the power supply circuit according to the invention. The power supply circuit includes a dc power source 1, switching means 2 including a switching element S1 capable of switching an input from the dc power source 1 to convert the input to ac and outputting ac from an output terminal thereof, the ac changing between two different potentials, series resonance means 4 provided in series to current flowing from the output terminal of the switching means 2, the series resonance means being capable of generating resonance current, parallel resonance means 5 provided in parallel to voltage produced at the output terminal of the switching means 2, the parallel resonance means being capable of generating resonance voltage, dc output control means 3 for full-wave rectifying and smoothing an ac input supplied through the series resonance means 4 and the parallel resonance means 5 to provide with a dc and switching control means 6 for controlling the switching element S1 of the switching means 2 so as to intermittently turn on the switching element S1.

The series resonance means 4 includes inductance L2 and a capacitor C2. The parallel resonance means 5 includes inductance L1 and a capacitor C1. The dc output means 3 includes a rectifying diode D1, a smoothing inductance L3 and a smoothing capacitor C3. A dc output is supplied from output terminals 7 and 8 to a load RL.

The operation of the power supply circuit of FIG. 1 will be described with reference to FIGS. 8(a) to 8(g). Upon turning on of the switching element S1, the diode D1 becomes a forward direction and a charge current ID1 flows into the capacitor C2. This current ID1 constitutes a series resonance current having a sine waveform by the inductance L2 and the capacitor C2 (see FIG. 8(b)). The inductance L3 is set at L3>>L2 so as not the prevent this resonance operation. At a half wave of this resonance current, the direction of the current is reversed and the diode D1 is turned off because opposite voltage is applied thereto. The series resonance therefore is ceased. In other words, the series resonance is ceased automatically when the resonant current has returned to zero upon completion of a half wave.

At this time, the current at the inductance L2 is zero and the inductance L2 is in a state in which it has discharged all energy, so that a spike noise accompanying turning off of the diode D1 is not generated. Voltage accumulated in the capacitor C2 due to the current resonance is smoothed by the inductance L3 and the capacitor C3 and provided as dc from the output terminals 7 and 8 to the load RL.

After completion of the current resonance, the switching element S1 is turned off. Time of the current resonance (FIG. 8(b)) is a constant value which is determined by values of the inductance L2 and the capacitor C2 and, therefore, the time during which the switching element S1 is on (FIG. 8(f)) may be set at this constant value. Actually, this time during which the switching element S1 is on is set at a slightly longer time than the current resonance time so that it is turned off after the current resonance has completely finished.

While the switching element S1 is on, voltage VE is applied to the inductance L1 and, therefore, exciting current IL1 flows through the inductance L1. When the switching element S1 is off, the current IL1 flowing through the inductance L1 flows to the capacitor C1 whereby voltage resonance is started. During the voltage resonance, voltage across the inductance L1 (FIG. 8(a)) drops from voltage VE, becomes an opposite voltage passing the zero point and returns to the voltage VE in a sine wave due to the voltage resonance.

When the switching element S1 is turned on at a timing when the voltage of the inductance L1 has returned to VE, the resonance mode is switched to the current resonance mode again and the above described operation is subsequently repeated. Time of the voltage resonance (FIG. 8(d)) is time during which the switching element S1 is off. This time is set to a time period during which the voltage across the inductance L1 returns to the voltage VE (determined by the inductance L1 and the capacitor C1).

Figure 8:
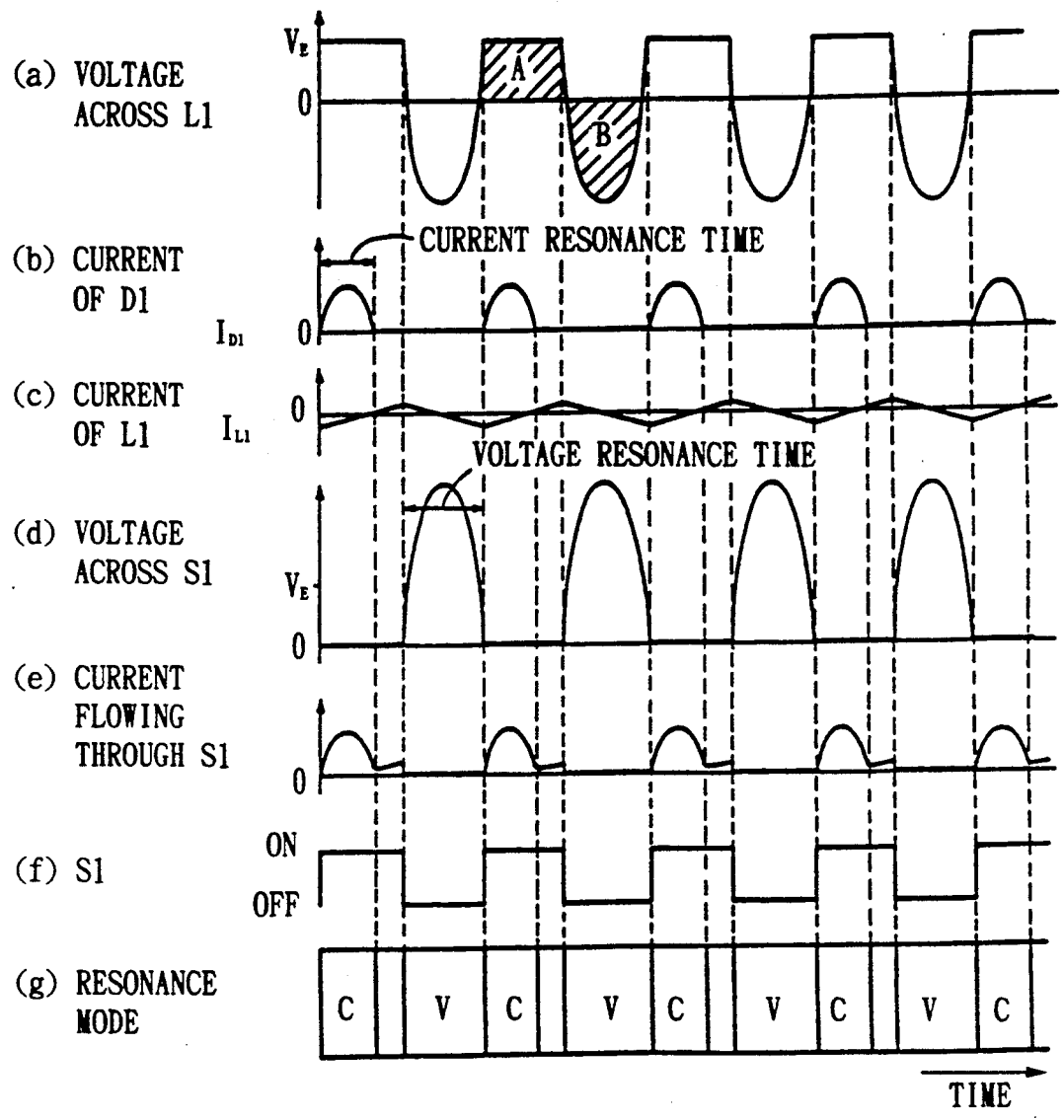
FIG. 8 is a time chart for explaining operation of the power supply circuit of FIG. 1.

In FIG. 8(a), the area A on the positive side and the area B on the negative side are equal because they are both voltages across the inductance L1. Thus, the peak value of the area B is caused to change depending upon the relation between the time during which the switching element S1 is on and a resonance frequency of the voltage resonance. This setting has a certain degree of freedom. If, however, the resonance frequency of the voltage resonance is set at a too high value to the on time of the switching element S1, the peak value of the B area increases which in turn causes voltage applied to the switching element S1 (FIG. 8(d)) to increase with resulting necessity for increasing voltage resisting property of the switching element S1. This results in increase in the manufacturing cost. Conversely, if the resonance frequency is too low, interval of voltage resonance (i.e., time interval between the end of current resonance and start of next current resonance) becomes too long which causes increase in the peak value of the current ID1 of each current resonance with resulting increase in noise. Accordingly, the relation between the time during which the switching element S1 is on and the voltage resonance frequency is determined so that the relation between the voltage applied to the switching element S1 and the peak value of the current ID1 of the current resonance becomes an optimum one.

The voltage resonance by the inductance L1 and the capacitor C1 is made for converting the dc voltage VE to an ac voltage (since a transformer is used in a specific circuit) and energy of the current resonance is used for an output voltage. Therefore, a value of the current IL1 (FIG. 8(c)) flowing through the inductance L1 is set at the smaller within a range in which an accurate voltage resonance can be obtained, the less becomes the switching loss. For setting the current IL1 flowing through the inductance L1 at a small value, the inductance L1 is set at L1>>L2. At this time, the current flowing through the switching element S1 becomes a sum of the current ID1 (FIG. 8(b)) flowing through the diode D1 and the current IL1 (FIG. 8(c)) flowing through the inductance L1 as shown in FIG. 8(e). Since, however, ID1 can be made ID1>>IL1 by setting L1>>L2 as described above, the current ID1 due to the current resonance becomes predominant in the current flowing through the switching element S1, so that the switching element S1 performs substantially an operation in which the switching element S1 is turned on at a voltage zero state and turned off at a current zero state, whereby the switching loss is reduced to the maximum extent possible and noise is reduced to the maximum extent possible.

Figure 9:
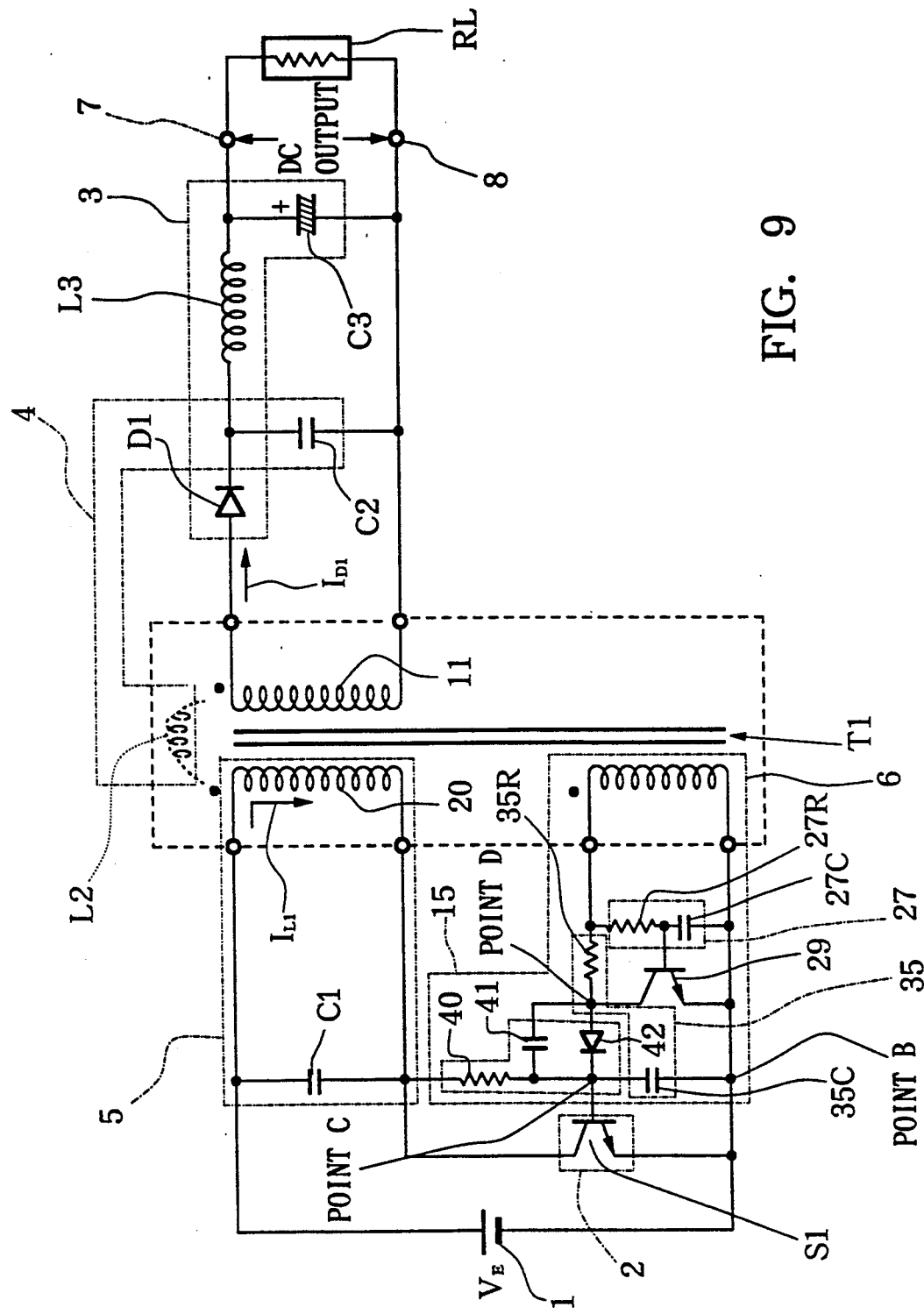
FIG. 9 is a circuit diagram showing a specific construction of the power supply circuit of FIG. 1.

A specific circuit embodying the above described basic construction of the invention is shown in FIG. 9. This power supply circuit has a transformer, performs a switching operation by self-excited oscillation and includes a starting circuit. In FIG. 9, the same component parts as those in FIG. 1 are designated by the same reference characters.

A winding 20 (primary winding) and a winding 21 (feedback winding) are wound on the same core of a transformer T1. The windings 20 and 21 are connected to each other in the positive feedback direction. A secondary winding 11 is provided in the transformer T1.

Parallel resonance means 5 includes a primary self inductance L1 of the transformer T1 and a capacitor C1. Series resonance means 4 includes a rectifying diode D1, a smoothing inductance L3 and a smoothing capacitor C3 and supplies a dc output from output terminals 7 and 8 to a load RL. The inductance L3 is set at L3>>L2 to avoid an adverse effect on the current resonance.

A transistor S1 is a main switching transistor and a transistor 29 is an auxiliary switching transistor. A time constant circuit 35 consisting of a capacitor 35C and resistance 35R controls a timing at which the main switching transistor S1 is turned on. A time constant circuit 27 consisting of a capacitor 27C and resistance 27R controls a timing at which the main switching transistor S1 is turned off.

A starting circuit 51 consisting of resistance 40, a capacitor 41 and a diode 42 is provided at the base circuit of the main switching transistor S1. The resistance 40 is of a high resistance value because a power loss occurs in this resistance and the capacitor 41 has a large capacity for obtaining a strong starting force.

The power supply circuit of FIG. 9 is started in the following manner. When the dc power source 1 is thrown in, voltage at the primary winding 20 of the transformer T1 is zero and the charged voltage of the capacitor 41 is also zero. Current flowing through the resistance 40 is very small and, after charging the capacitor 41, it flows through the resistance 35R and the winding 21 to a point B but the current is not so large as to produce a large potential difference across the resistance 35R. Since points B, C and D are initially at substantially the same potential, the main switching transistor S1 is in an off state.

As time elapses, the capacitor 41 is charged and, upon reaching of the potential difference between the points B and D to a base-emitter forward voltage of the main switching transistor S1, the transistor S1 enters an active region. At this time, a positive feedback loop from the feedback winding 21 to the base of the transistor S1 through the resistance 35R and the capacitor 41 is formed whereby the main switching transistor S1 is turned on in an accelerated manner due to a positive feedback and is kept in an on state by a large base current flowing from the winding 21 through the resistance 35R. The current flowing from the winding 21 to the capacitor 41 at this time is much larger than the current charged reversely from the reistance 40 and, therefore, potential at the capacitor 41 becomes potential of a forward direction of the diode 42 and fixed to this forward direction of the diode 42 after starting. This diode 42 also maintains the positive feedback loop after starting. After starting, therefore, oscillation is maintained and charging current from the winding 21 becomes predominant and a small reversely charging current from the resistance 40 becomes almost negligible, so that there is no likelihood that the main switching transistor S1 is erroneoulsy turned on due to the resistance 40 at a timing when it should be turned off.

When the main switching transistor S1 is on, the transistor S1 maintains the on state due to the positive feedback operation by the windings 20 and 21. Voltage at the capacitor 27 rises with time at a time constant by the resistance 27R and the capacitor 27C whereby the transistor 29 is turned on and the transistor S1 is turned off after lapse of a predetermined period of time. Upon turning off of the transistor S1, voltage across the winding 21 is reversed due to induction by the winding 20.

When the switching element S1 is on, the diode D1 is in the forward direction so that the charging current ID1 flows into the capacitor C2. This current ID1 is a sinusoidal dc resonance current due to the inductance L2 and the capacitor C2. Upon reversing of this current ID1 after a half cycle, the voltage applied to the diode D1 is reversed and the diode D1 is turned off. The series resonance is thereby ceased. In other words, the series resonance is automatically ceased upon completion of half cycle of the resonance current and returning of the current to zero. The time constant of the time constant circuit 27 which determines the off timing of the switching element S1 is determined at a value at which the switching element S1 is turned off after completion of the series resonance.

When the series resonance has been completed, the current of the inductance L2 is zero and the inductance L2 has discharged all energy so that a spike noise accompanying turning off of the diode D1 is not produced. The voltage accumulated in the capacitor C2 by the current resonance is smoothed by the inductance L3 and the capacitor C3 into a dc voltage which is supplied from output terminals 7 and 8 to a load RL.

While the switching element S1 is on, voltage VE is applied to the inductance L1 and, therefore, an exciting current IL1 flows through the inductance L1. When the switching element S1 is turned off, the current IL1 flowing through the inductance L1 flows to the capacitor C1 whereby voltage resonance is started. In the voltage resonance, voltage across the inductance L1 is a sine wave which, like the one shown in FIG. 8(a), drops from the voltage VE, passes zero and, after becoming a reverse voltage, returns to the voltage VE.

Upon returning of the voltage of the inductance L1 to the voltage VE, the switching element S1 is turned on at this timing (the time constant of the time constant circuit 35 is controlled so that the switching element is turned on at such timing) whereby the switching element S1 is turned on at a voltage zero state. Upon turning on of the switching element S1, the resonance mode changes to the current resonance mode again and the above described operation is subsequently repeated.

What is claimed is:

1. A power supply circuit comprising:
   a dc power source;
   switching means including a switching element for switching a dc input from the dc power source to convert the dc input to ac and outputting ac from an output terminal thereof, the ac changing between two different potentials;
   series resonance means provided in series to current flowing from the output terminal of the switching means for generating current resonance;
   parallel resonance means provided in parallel to voltage produced at the output terminal of the switching means for generating voltage resonance;
   dc output control means for rectifying and smoothing an ac input supplied from the switching means through the series resonance means and the parallel resonance means; and
   switching control means for controlling the switching element of the switching means so as to intermittently turn on the switching element,
   wherein said switching control means, after turning on of the switching means, turns off the switching means when current flowing through the switching means has been reduced substantially to zero by the series resonance means and, after turning off of the switching means, turns on the switching means when voltage applied to the switching means has returned substantially to a voltage immediately before turning off of the switching means by the parallel resonance means.

2. A power supply circuit as defined in claim 1 wherein a transformer is provided in a signal path from the switching means to the dc output means and said series resonance means comprises a capacitor provided on the transformer and leakage inductance between the primary and secondary sides of the transformer.

3. A power supply circuit as defined in claim 2 wherein the capacitor of the parallel resonance means is provided on the primary side of the transformer.

4. A power supply circuit as defined in claim 2 wherein the capacitor of the series resonance means is provided on the secondary side of the transformer.

5. A power supply circuit comprising:
   a DC power source;
   switching means including a switching element for switching a DC input from the DC power source to convert the DC input to AC and outputting AC from an output terminal thereof, the AC changing between two different potentials;
   series resonance means provided in series to current flowing from the output terminal of the switching means for generating current resonance;
   parallel resonance means provided in parallel to voltage produced at the output terminal of the switching means for generating voltage resonance;
   DC output control means for rectifying and smoothing an AC input supplied from the switching means through the series resonance means and the parallel resonance means; and
   switching control means for controlling the switching element of the switching means so as to intermittently turn on the switching element,
   wherein said switching control means, after turning on of the switching means, turns off the switching means when current flowing through the switching means has been reduced substantially to zero by the series resonance means and, after turning off of the switching means, turns on the switching means when voltage applied to the switching means has returned substantially to a voltage immediately before turning off of the switching means by the parallel resonance means, said series resonance means comprises capacitance and inductance connected in series.

6. A power supply circuit as defined in claim 1 wherein said parallel resonance means comprises capacitance and inductance connected in parallel.